May 20, 1930.   P. E. CHAPMAN   1,759,479
TESTING INSTRUMENT
Filed June 23, 1922   3 Sheets-Sheet 1
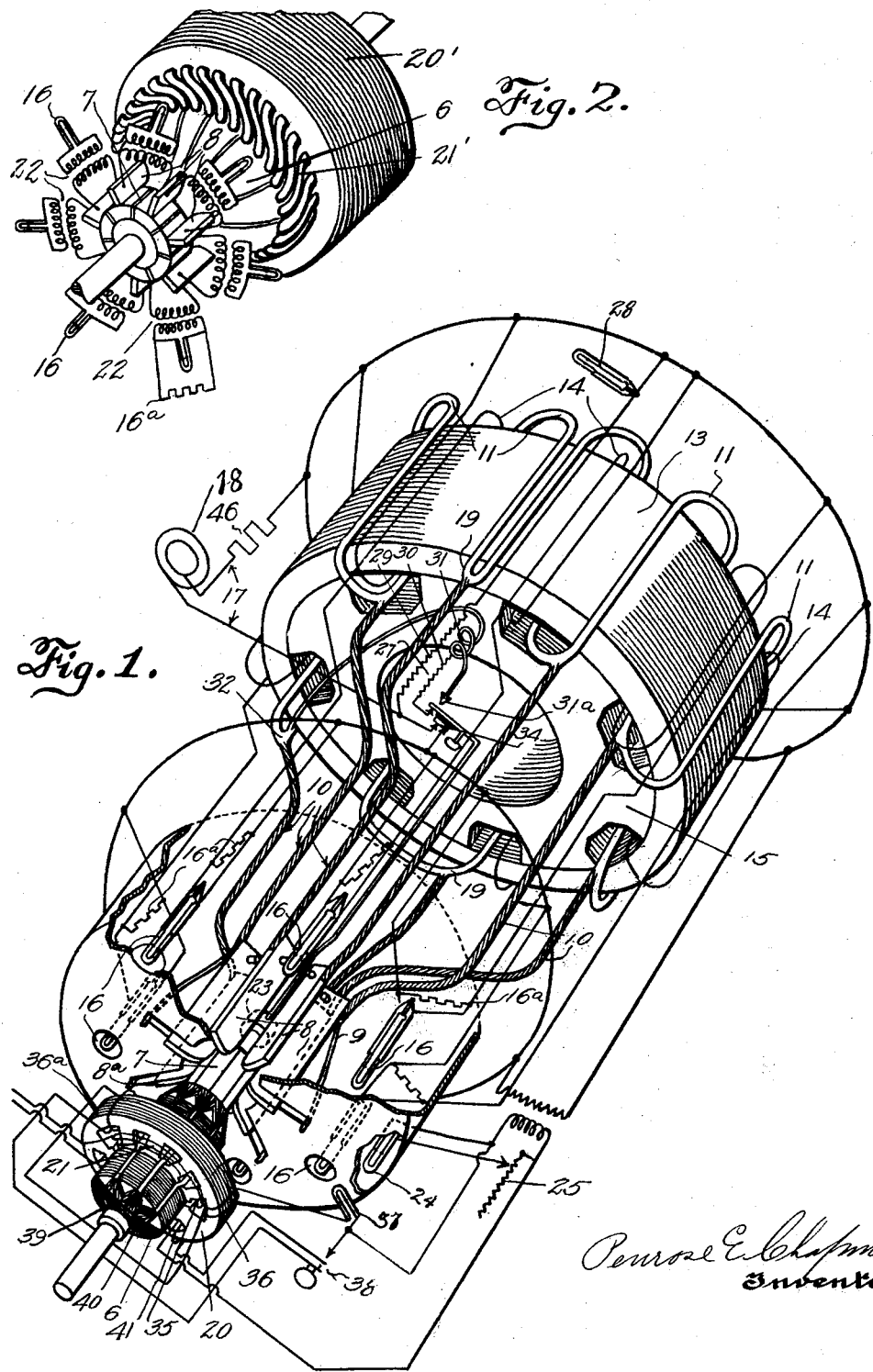

May 20, 1930.  P. E. CHAPMAN  1,759,479
TESTING INSTRUMENT
Filed June 23, 1922  3 Sheets-Sheet 2

Inventor:
Penrose E. Chapman

May 20, 1930.  P. E. CHAPMAN  1,759,479
TESTING INSTRUMENT
Filed June 23, 1922  3 Sheets-Sheet 3
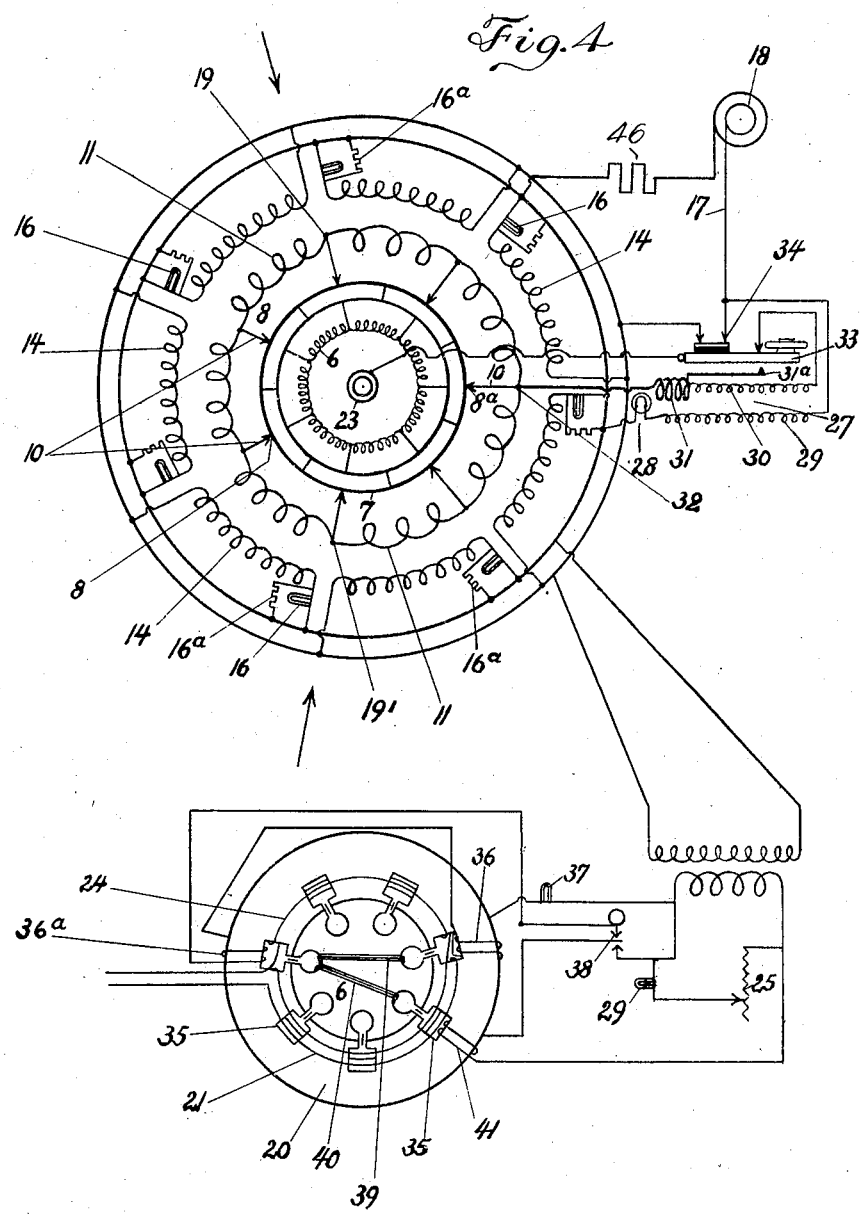
INVENTOR
Penrose E. Chapman Patented May 20, 1930

1,759,479

UNITED STATES PATENT OFFICE

PENROSE E. CHAPMAN, OF ST. LOUIS, MISSOURI

TESTING INSTRUMENT

Application filed June 23, 1922. Serial No. 570,506.

The object of my invention is the reduction in time necessary for, and an improvement in, the testing of armatures after connecting to the commutator, bare commutators, rheostats and all other sectional devices, particularly after they are finished for such defects as short circuits between sections, shorts between turns, short circuits between top and bottom layers, open circuits, bad joints (in some cases), mixed connections, variations in turns, grounds, etc., and at substantial potential also for commutator lead and other defects, to give instantaneous and largely simultaneous indications of the presence of such defect, what it is, and where it is. For brevity the word armature will be taken to include any such sectional device to which my armeter may be adapted.

At present these defects are located by testing each section, and making each type of test separately, requiring considerable time.

I accomplish my object by either of the methods diagrammatically depicted in the drawings in which Figure 1 represents one form of my invention using alternating current.

Figure 2 is a modification in which the energy for testing is applied by induction to the core of the armature, multiple readings being taken off the commutator.

Figure 4 is a diagram of the connections shown in Figure 1.

Figure 3:
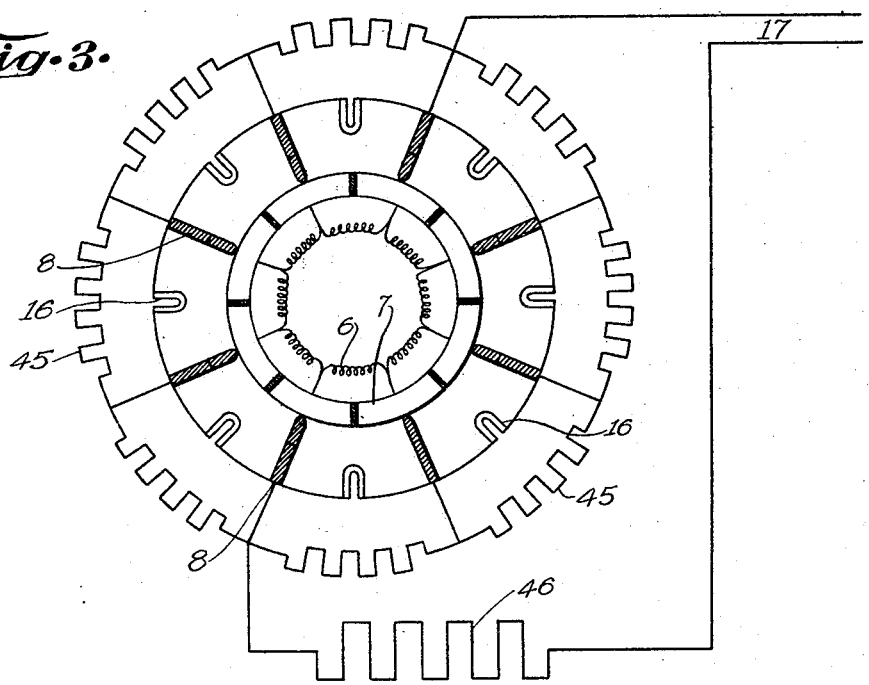
Figure 3 is a modification using direct current.

Similar parts are numbered the same in all views. 6 is the armature to be tested with commutator 7, 8 are fingers which should be flexibly mounted with springs 9 behind them to enforce contact with the sections of the commutator 7. I provide leads 10 from fingers 8 to the secondaries 11 of a multiple transformer, 13 being the core thereof and 14 the primaries.

I prefer to make this transformer as illustrated using a principal core 13 preferably in the shape of a ring as shown, on which the primaries 14 and secondaries 11 are assembled.

To prevent a load applied to any of the secondaries affecting the current in all the primaries I provided a shunt core 15 which will in such a case shunt any unbalance in magnetism linked with the other transformers around the affected coil. This form of transformer saves considerable weight and core losses over individual transformers.

I place indicating devices 16 in series with the primaries 14 of each transformer and perfer carbon telephone switchboard lamps for these indicators but may use any other electrical indicator or measuring device instead.

The word indicator will herein be taken to include any device capable of indicating the presence or magnitude of electricity.

It is sometimes desirable to pass more current into the transformers than the capacity of the lamps 16. I then supply shunts $16^a$ around said lamps, only a few shunts are shown for the sake of clearness.

On single phase the primaries 14 of these transformers are preferably connected all in the same direction in parallel across the line 17.

This line may in some cases be fed with higher than commercial frequency as by generator 18 in order to permit of testing armatures at normal E. M. F. without excessive demands for current.

On single phase, secondaries 11 may be connected in series parallel, to produce polarities similar to the armature or devices which it is desired to test. To accomplish this it is desirable to connect a number of secondaries 11 corresponding to the polar span of the armature in series, and to oppose or parallel these polar groups at points at which the maximum potential is desired. Two of these points are diagrammatically shown at 19, 19'.

This polarization may also be done in the primary connections.

The groups of secondaries 11 are not only secondaries but also a resistance having taps, the resistance between each tap determining to some extent the maximum indication of the indicators 16. For this reason the inherent resistance thereof is calibrated, in addition to caliberation for turns.

The term, source of potential, will herein be used to refer to windings or resistance or both from which testing potentials were last derived.

Where the number of sections per group of coils of the potential windings (as secondaries 11 or resistances Figure 3) are the same, they should all be alike. Where they are different then the potentials of the coils in the different groups should be varied so that the total potential of the group will be equal to the group against which it is balanced or paralleled.

It is desirable that the potential circuits of the armeter should be in a general way of the same style of connection as the armature to be tested. For the sake of clearness I have shown the continuous connection common on bipolar armatures only. It is obvious that for testing such windings as wave, reentrant, and others the armeter may have the connections of the potential circuits of similar character.

A ballast resistance 46 Figures 1 and 3 may be inserted where desired for limiting the maximum current.

In some cases I provide a laminated magnetic yoke or choke core 20 in which to slip the core of the armature to be tested. This yoke will raise the self induction of the armature and enable higher E. M. F. to be used across the sections of the commutator than without.

I may provide a winding 21 on this yoke and supply an alternating current to it via any suitable leads to the line 17. Coils 21 should be connected to produce in the armature being tested a counter E. M. F. to the sources of potential connected to the commutator.

A still further modification as shown in Figure 2 is to supply all the testing current inductively through a ring 20' which would preferably have a polyphase winding 21'. I would then connect the indicating devices 16 with or without shunts 16ª to the commutator. I may in this modification if the E. M. F.'s induced across the commutator sections are not suitable for the indicating devices interpose transformers 22 as shown.

The operation of the armeter is as follows:

The commutator 7 of the armature 6 is placed in the fingers of the armeter 8 in such a manner that each finger will press on a segment, the bushing 23 acting as a guide.

When alternating current is supplied, if there are no short circuits the indicating devices as lamps 16 will all light up part way. If there is a short circuit between a section, then that section between which the short circuit occurs will demand more current from its transformer, raising the demand on its primary which will light up the lamp in series therewith more or less as the occasion may demand. Should there be an open circuit, the normal demand for current through the winding will be interrupted and the lamps instead of lighting up part way will remain extinguished indicating an open circuit, however, should there be a short circuit through the winding as say from side to side then the entire set or a group of lamps would light up more or less according to location thereof. Where the apparatus is made single phase, the armature should be rotated in the instrument until the lamps show brightest indicating that the said short circuit is then about in line with the points of maximum potential 19, 19'. Mixed connections, will be indicated by irregularities in the illumination of the lamps, as for instance a pair of leads crossed, two lamps would show dim with a normal one between the same.

For comparison I may provide a pilot lamp 24 whose temperature may be adjusted by the rheostat 25 to the color of the indicating lamps 16 when testing a normal armature.

It is desirable to test each armature simultaneously for grounds and at approximately normal or working potential. I may provide a ground detector to do this. A supporting bushing 23 fitting the armature shaft or other appropriate connection is used as one terminal of the detector. I prefer in order to insulate the ground detector from the supply circuit to feed it through a transformer 27.

The indicator as lamp 28 may be either in series with the primary 29 or secondaries 30, 31 as desired. I have shown it in the primary 29. One end of the ground transformer secondary (31) is connected to a point of the armeter circuits at mid-potential point as 32 the other via fine part of secondary 30 and switch 33 to guide bushing 23. Thus the interference of other testing potentials will be minimized.

While the normal potential ground test just described will give the insulation of the armature a pretty good dielectric test, and will indicate a ground it will not in some cases locate the ground. To accomplish this I may provide a lower potential secondary 31 one end of which may be connected to one of the mid potential (or any other) point as 32 and through the three way push button switch 33 to the ground bushing 23. This switch rests normally in contact with the end of the secondary 30 which will indicate the presence of a ground but not its location. By changing said switch 33 to the contact 31ª and rotating the armature the ground may be located for the lamp 28 will light up more or less when the grounded section comes in contact with finger 8ª. In order to avoid confusion when making the ground locating test just described I prefer to open all other circuits and I may do this by the back contacts 34 on the ground locating switch 33. There are other modifications that I may make in the ground detector circuits without departing from the spirit of this invention.

Another test which it is desirable to make is for the angular position of the commutator with reference to the windings with which it is connected commonly called "lead" or "commutator lead."

In this instrument I may make this test by a number of different methods each one of which being a preferred form in its particular range of usefulness. Where the choke core 20 is present either with or without counter E. M. F. winding 21 I prefer to supply one or more of the slots 35 thereof with an exploring coil preferably one for each side of the coil to be tested 36, 36ᵃ and to interconnect them. These windings may be loaded as with an indicating device 37 or even directly short circuited. If the indicating device 37 is used it is preferable to place it in juxtaposition to the indicator or indicators 16 which indicate other conditions of the particular armature coil whose lead to the commutator is to be tested. The coils 36 and 36ᵃ are shown connected in series, one end thereof being connected via lamp 37, to lower contact of switch 38, the other to the top contact thereof.

The operation is as follows: Upon closing the switch 38 the current will be induced in the exploring coils 36, 36ᵃ by the current passing through the coil in the armature 6 which current will be indicated by one or more indicators 16 and if the lead of the commutator is correct this indication will occur on the predetermined indicator, or indicators where more than one section of winding is placed in any one slot. If the indicator 37 is used in connection with the exploring coil it will indicate the presence of the current in said exploring coil.

I prefer to supply an exploring coil for each side of the armature coil 39 as by this means the commutator lead will be determined as to both the degree thereof, whether forward or backward and as to the span of the armature coil 39.

With this arrangement should the span of the coil not agree with that predetermined by the position of the exploring coils 36, 36ᵃ the indication of the indicators 16 would be less than usual for the energy demanded by the exploring coils will then be taken from coils in different slots indicating on other than the usual indicators.

The exploring coils may produce a disturbance in other indicators than the ones desired owing to two halves of different coils as 39 and 40 being in the same slot. To neutralize this "cross" disturbance I may put balancing coils 41 in the choke core slots that are opposite to the disturbing coil (as 40) or coils, and supply a potential to them from any convenient source which will neutralize said cross disturbance.

Figure 3 is a modification of this apparatus useful in some cases with either A. C. or D. C. in which the characters denoting the same parts are the same as above. The transformers have been eliminated and the indicators 16 placed in series with each other. Fingers 8 connected between each pair of indicators connect same in parallel with the commutator segments 7. Shunts 45 may be provided as above.

The necessary plurality of sources of potential for successful testing after the manner herein are obtained by the potentiometer drop across the armature section, the corresponding indicator 16 and its shunt (if any) 45 in this type of my device. The apparatus is fed with current from line 17 through auxiliary or ballast resistance 46.

We will take the term "potential producing circuits" to include any circuits in which the necessary potential is generated for testing in the manner herein, be they transformer, or potentiometer type as shown in Figure 3.

The operation of this modification is exactly similar to that of the device as shown in Figure 1, except that the indications are reversed, that is an open circuit would indicate bright, a short circuit by whole or partial extinguishment etc. A short through the winding would of course short circuit the indicators extinguishing the same, the balast resistance 46 taking up the line voltage.

Having now described my invention I wish to claim:

1. In an armature testing instrument, the combination of a plurality of transformers, having their secondaries connected, and current indicators connected in series with their primaries.

2. In an armature testing instrument, the combination of a plurality of transformers having their secondaries connected in series and current indicators connected in series with their primaries.

3. In an armature testing instrument, the combination of a plurality of transformers having their secondaries connected and means between each secondary for connecting the device to be tested.

4. In an armature testing instrument, the combination with a plurality of transformers of indicating devices connected in series with said plurality of transformers whose secondaries are connected together and means between each of said secondaries for making connection to the article to be tested.

5. In an armature testing instrument, the combination with a plurality of transformers of indicating devices connected in series with the primaries of said plurality of transformers whose secondaries are connected together and means between each of the said secondaries for making connection to the article to be tested.

6. In an armature testing instrument, the combination of a plurality of transformers having their secondaries connected whose primaries are connected in multiple, current indicators connected in series with their primaries.

7. In an armature testing instrument, the combination of groups of sectional potential producing circuits, means for varying the potential in said groups so that the total potential may be the same in each group, although the number of sections are not the same per group, indicating devices for each section.

8. In an armature testing instrument, the combination of a plurality of transformers which have their secondaries connected, current indicators connected in series with their primaries and shunts across the said indicators.

9. In an armature testing instrument, the combination of a plurality of transformers whose secondaries are connected, said transformer connections being polarized to produce points of maximum potential corresponding to those of the device to be tested.

10. In an armature testing instrument, the combination of a plurality of transformers, indicating devices in series with the primaries thereof, secondaries of said transformers connected together and transformer connections being polarized to produce points of maximum potential corresponding to those of the device to be tested.

11. In an armature testing instrument, the combination of a plurality of transformers whose secondaries are connected together, means between each secondary for connecting the device to be tested thereto, and connections for said transformers to produce points of maximum potential corresponding to those of the device to be tested.

12. In an armature testing instrument, the combination of an indicating device in series with a plurality of transformers whose secondaries are connected together, means between the secondaries for connecting the device to be tested thereto, connections for said transformers to produce points of maximum potential corresponding to those of the device to be tested.

13. In an armature testing instrument, the combination of a plurality of transformers whose secondaries are cumulatively connected together in series to form groups, said groups being connected in normally balanced opposition.

14. In an armature testing instrument, the combination of a plurality of transformers, whose secondaries are cumulatively connected in series to form groups said groups being connected in normally balanced opposition to produce polar potentials similar to those of the device to be tested.

15. In an armature testing instrument, the combination of a plurality of transformers whose secondaries are cumulatively connected in series to form groups, said groups being connected in normally balanced opposition to produce polar potentials similar to those of the device to be tested and means between said secondaries for connecting the device to be tested.

16. In an armature testing instrument, the combination of means for testing an armature comprising indicating devices connected with potential producing circuits sections of said circuits being connected in a similar manner to the windings of said armature.

17. In an armature testing instrument, the combination of means for testing an armature comprising indicating devices connected with groups of potential producing circuits sections of said circuits being connected in a similar manner to said windings.

18. In an armature testing instrument, the combination of means for testing an armature comprising indicating devices connected with groups of potential producing circuits sections of said circuits being connected in a similar manner to said armature, said groups being connected to produce polar potentials similar to those of said armature.

19. In a testing instrument the combination of a plurality of sets of transformer windings having a common core, with a shunt core adapted to shunt any irregularity in the magnetism linked with any set of the said windings around other sets.

20. In an armature testing instrument, the combination of means for inductively producing a testing potential in the windings of an armature having a plurality of sections, indicating devices, one for each of said sections of said armature, and means for connecting said sections to said indicating device, including transformers linking said indicating devices and said sections.

21. In an armature testing instrument, the combination of a resistance having taps at suitable portions, means for connecting said resistance taps to a plurality of armature sections and an indicating device connected with each of said sections.

22. In an armature testing instrument, the combination of means for applying a testing current to an armature to be tested, indicators for a plurality of sections of said armature means for connecting said indicators to the sections of said armature and a ballast resistance connected in series with the said combination.

23. In an armature testing instrument, the combination of means for testing the winding of an armature with means for increasing the self induction of said armature.

24. In an armature testing instrument, the combination of means for testing the winding of an armature and a choke core associated with the core of said armature for increasing the self induction of said armature.

25. In an armature testing instrument, the combination of means for testing the winding of an armature and of a toothed choke core associated with the core of said armature for increasing the self induction of said armature.

26. In an armature testing instrument, the combination of means for testing the winding of an armature and means for applying a counter E. M. F. to the winding of the said armature consisting of a core associated with the said armature core having exciting windings applied thereto.

27. In an armature testing instrument, the combination of means for testing the commutator lead, consisting of a choke core associated with the core of said armature, an exploring coil thereon with means for indicating the activity of said exploring coil.

28. In an armature testing instrument, the combination of means for testing the commutator lead of an armature consisting of an exploring coil a core therefor adapted to be associated with the core of said armature, with means for indicating which sections of the commutator are connected to the winding contained in the slot associated with said exploring coil.

29. In an armature testing instrument, the combination of means for testing the commutator lead of an armature consisting of an exploring coil, a core therefor adapted to be associated with the core of said armature, with means for indicating which sections of the commutator are connected to the winding contained in the slot associated with said exploring coil.

30. In an armature testing instrument, the combination of means for indicating the lead of the commutator of an armature, consisting of means for supplying a testing current to a section of said armature, a current indicator associated therewith, an exploring coil having a core adapted to be associated with the core of said armature.

31. In an armature testing instrument, the combination of means for indicating the lead of the commutator of an armature, consisting of means for supplying a testing current to a section of said armature, a current indicator associated therewith, and an exploring coil having a core adapted to be associated with the core of said armature, an electric indicator associated with said exploring coil.

32. In an armature testing instrument, the combination of means for testing the commutator lead of an armature, consisting of means for indicating a condition of armature sections, an exploring coil associated therewith and a balancing coil for neutralizing cross disturbance caused by the presence of more than one armature coil in a slot, and means for suitably exciting the said balancing coil.

33. In an armature testing instrument, having sectional indicators the combination of means for testing the winding of an armature using alternating current, means for testing the commutator lead of said armature consisting of a choke core associated with the core of said armature, and an exploring coil applied to the said choke core adapted to affect a sectional indicator of said armeter.

34. The combination of an armature testing instrument having a plurality of section indicators, a transformer for each section and means for connecting same to the armature to be tested with a high frequency source of current supply.

35. In an armature testing instrument, means for testing an armature, comprising means for applying a testing potential to the section of said armature, indicators for revealing currents that are caused to flow by said potential in said armature combined with means for testing the commutator lead of said armature.

In testimony whereof I hereunto affix my signature, this 7th day of June, 1922.

PENROSE E. CHAPMAN.